United States Patent [19]

Groll

[11] Patent Number: 4,566,235
[45] Date of Patent: Jan. 28, 1986

[54] TILE BLOCK

[76] Inventor: Hartmut Groll, Rettigstr. 4, 7570 Baden-Baden, Fed. Rep. of Germany

[21] Appl. No.: 549,616

[22] Filed: Nov. 7, 1983

[30] Foreign Application Priority Data

Nov. 20, 1982 [DE] Fed. Rep. of Germany ....... 3242942

[51] Int. Cl.[4] .............................................. E04B 5/48
[52] U.S. Cl. ....................................... 52/220; 52/433; 52/607; 52/589
[58] Field of Search ................................... 52/384–392, 52/604–607, 220, 221, 302, 303, 659, 433, 589, 590, 593, 98–100; 165/49, 53, 168

[56] References Cited

U.S. PATENT DOCUMENTS

| 378,825 | 2/1888 | Brannigan | 52/390 |
| 522,105 | 6/1894 | Canda | 52/303 |
| 572,762 | 12/1896 | Landers | 52/303 |
| 1,781,780 | 11/1930 | Hall | 110/331 |
| 1,968,034 | 7/1934 | Ferguson | 52/606 |
| 2,018,201 | 10/1935 | Currie | 52/390 |
| 2,031,684 | 2/1936 | Berger | 52/396 |
| 2,073,130 | 3/1937 | Wallace | 52/386 |
| 2,184,714 | 12/1939 | Freeman | 52/220 |
| 2,737,693 | 3/1956 | Robbins | 52/384 |
| 3,142,938 | 8/1964 | Eberhardt | 52/391 |
| 3,852,930 | 12/1974 | Naaman | 52/659 |

FOREIGN PATENT DOCUMENTS

| 24556 | 5/1919 | Denmark | 52/607 |
| 2021582 | 11/1971 | Fed. Rep. of Germany | 165/53 |
| 2742444 | 3/1979 | Fed. Rep. of Germany | 52/750 |
| 1040036 | 5/1953 | France | 52/220 |

Primary Examiner—James L. Ridgill, Jr.
Attorney, Agent, or Firm—Klaus J. Bach

[57] ABSTRACT

A tile for covering surface areas such as floors and walls has a tile surface and beneath the tile surface a body portion having side walls extending perpendicularly from the tile surface edges so as to form a tile block and the body portion has channels formed therein so as to extend thereacross to form channels in which pipes or cables may be disposed or through which a heating medium may be conducted for heating the block and the room laid out with such tile blocks.

16 Claims, 7 Drawing Figures

TILE BLOCK

BACKGROUND OF THE INVENTION

The invention relates to tiles for use as wall and floor coverings which have hard flat or profiled surfaces.

Such tiles usually consist of earthenware, that is, clay or stoneware, and are utilized as face bricks or glazed stoneware plates particular in industrial buildings and stables. Stoneware tiles, especially ceramic tiles which are first fired and surface-glazed in a second pass through a kiln, are utilized in wet rooms, in commercial kitchens, in food stores, in dairies, in bakeries, etc., that is, they are utilized wherever ease of cleaning is important. The advantage of such kiln-fired tiles is that they are very hard, frost resistant, insensitive to acids and long wearing. Usually the tiles are supported on thin layers of mortar, utilizing also special water-based binding agents and epoxy cement. Such mounting requires a suitable base, usually a carefully prepared concrete floor or another smooth subfloor since the thin cement layers usually do not or do not fully permit equalization of unevenness in the subfloor.

The use of ceramic tiles in living areas is generally very limited, especially because a tile floor or wall is always cold or rather is always felt to be cold and therefore considered to be uncomfortable.

In order to utilize the advantages of tiles without the disadvantages, tiled floors have been built which included heating means in the floor. For this purpose, thick layers of concrete subfloors with heating pipes embedded therein have been built, onto which the tiles were cemented. Such work, however, is time-consuming and expensive. Repair of such floor heaters is furthermore practically impossible. Nevertheless, such a floor is not only comfortably warm but provides, at the same time, the heat needed for heating the room in a very good manner.

The disadvantages of such tile floors are therefore:
1. the expensive and time-consuming manner of mounting;
2. the low subjective temperature of the tiles (as a result of their high heat conductivity).

SUMMARY OF THE INVENTION

These disadvantages are overcome by the present invention by providing tiles in the form of blocks for mounting on bases such as floors or walls, which tile blocks have tile surface areas disposed on a body portion which is provided with channels extending thereacross and arranged to be in alignment with the channels of adjacent tile blocks when mounted on a base so as to form passages for pipes, cables, heating or cooling media, etc.

Such tiles are not laid out in a thin bed; they are rather relatively heavy tile blocks which may be laid out side-by-side onto a level subfloor and which remain in place already by their weight and the friction between adjacent tile blocks. The tile blocks may be disposed on a well-insulating subfloor, for example, on waferboard panels, which would limit conduction of heat to the ground. To a large degree, however, heat conductivity already to the subfloor may be reduced by the provision of channels in the lower portion of the tile blocks, which channels also provide for some heat distribution among adjacent tiles by natural internal circulation of air, however small. The channels may also be utilized directly for a hot air heating system by conducting heated air through the channels in the tiles. This way, not only the tile blocks are heated but, at the same time, the whole room in which the tile blocks are laid out.

It is further noted that heating pipes may be disposed to extend through channels for heating the tile floor. The advantage of such an arrangement is that the heating pipes need not be embedded in concrete and, consequently, are easily accessible if repairs should become necessary. Such heating pipes radiate and transmit their heat directly to the tiles which, as a result, are heated up relatively rapidly; it is no longer necessary, as it has been in prior art floor heating systems, to heat the whole concrete subfloor and the tile bottom areas before the heat is finally noticeable on the tile top surface for heating a room. In place of heating pipes it is also possible to utilize pipes which carry a refrigerant for cooling a room or, for example, an ice skating ring.

In this connection, it is an important advantage that such tile blocks are frost insensitive.

It is also possible to pass through the channels formed by the tile blocks electric power lines and control wiring which, then, need not be placed into the walls, which is especially advantageous if the walls are stone or brick walls. The same is possible with water and gas pipes.

The tile blocks which are arranged side-by-side may be joined to one another on their side surfaces by interlocking structures, for example, by groove and tongue structures formed on the side walls of their base structures or resilient joining members inserted into slots or openings in adjacent sections of the tile blocks. Such resilient joining members consist of plastic bolts or plastic plates inserted into the openings or slots in adjacent tile blocks such that the tile blocks are resiliently joined to one another. Both joining methods have the advantage that the tile blocks are not rigidly joined to one another and the subfloor but permit slight movement relative to one another and the subfloor so that they are able to move with the floor and, consequently, are insensitive with regard to floor vibrations and warpings of the floor. The same advantage is obtained if the base structures of the tile blocks are cemented to one another by a resilient cement. This is not only a very good method of interconnecting the tile blocks but also seals the floor and prevents penetration of water. On tile blocks intended for such applications, an elastic side wall cement layer is preferably applied at the factory and the cement layer is preferably covered in the usual manner by a silicon paper.

The tile blocks may also be supported by resilient support members which may extend into bottom openings of the tile blocks or into downwardly open channels formed in the tile blocks in order to retain the tile blocks in predetermined positions relative to one another. Such an arrangement results in a very elastic support and also in good heat insulation because it provides for air pockets between the tile blocks and the subfloor.

If the tile blocks are to be mounted onto vertical walls, it is advisable to provide perforated mounting strips which are incorporated into the wall for safely retaining the tile blocks.

The tiles may further be so formed and arranged that water is permitted to drain through them into a collecting pan beneath from which the water can be drained. For permitting drainage, the joints between the tile blocks may have passages or passages may be formed in the tile blocks, for example, in the form of slots extending from the tile surfaces to the inner channel areas. For such applications, it is advisable to form the tile blocks with slightly convex surfaces so as to cause rapid drainage of water therefrom.

Tile blocks with such passages may also be used to supply hot air to a room or to remove used air therefrom through the channel network in the tile blocks.

Tile blocks with such slots may be utilized to construct a simple novel room heating system: For this purpose, tile blocks with slots are placed on the floor of a room along opposite walls and a heating pipe is installed in the slotted tile blocks extending along one of the walls, preferably the outside wall. Air heated by a heating pipe inside the tile blocks will rise upwardly along the wall and will draw fresh room air through the channels in the tile blocks from the row of tile blocks along the opposite wall. The air entering the tile blocks and passing across the room within the tile blocks is heated before leaving the row of tiles at the outer wall and rises along the outer wall upwardly to the ceiling, moves across the ceiling and downwardly along the inner wall and back into the tiles disposed along the inner wall. This will cause not only air circulation within the room but also will heat the floor at least to room temperature. Consequently, not only the room air is heated in this manner but also the floor which, as a result, is felt to be at a comfortable temperature.

It is also possible, of course, to conduct the air through the channels in the tile blocks by a blower which may be in communication with the channels at its suction or discharge end. It would be advantageous, for example, to have the discharge end of a warm air furnace or an air cooler connected to the row of tiles along one of the walls and the suction end of the furnace or air cooler to the row of tiles along the opposite wall of a room for heating the room or for cooling the room.

The manufacture of such tile blocks is relatively simple, especially if the tile blocks are open at their bottom ends. But the manufacture of tiles with channels closed at the bottom is not particularly problematic either, since the same processes as used in the manufacture of hollow bricks may be applied. Tile blocks according to the invention can, therefore, be manufactured quite inexpensively even if the lower tile block structure is manufactured separately and then combined with the tile. Generally, however, tile and tile base are manufactured as a single piece. The top tile portion and the base structure consist preferably of the same material such as stoneware, ceramic material or a water-setting material. However, it is possible to provide the base structure of plastic material on which a ceramic tile is cemented. In any case, the channels should be of the same size in all tile blocks and they should be arranged all at the same predetermined distance from the tile surface in order to facilitate the manufacture of the tile blocks and to obtain uniform tile block densities and to obtain alignment of the channels in the tile blocks when laid out on a floor which is particularly important when the channels are utilized for heating or cooling purposes.

SHORT DESCRIPTION OF THE DRAWINGS

FIG. 1 is a front view of two tile blocks mounted adjacent one another;
FIG. 2 is a side view of the tile blocks;
FIG. 3 is a bottom view of a square tile block;
FIG. 4 is a front view of a tile block especially adapted for floor heating systems;
FIG. 5 is a tile block for hot air heating systems; and
FIGS. 6 and 7 show different connecting structures.

DESCRIPTION OF PREFERRED EMBODIMENTS

Figure 1:
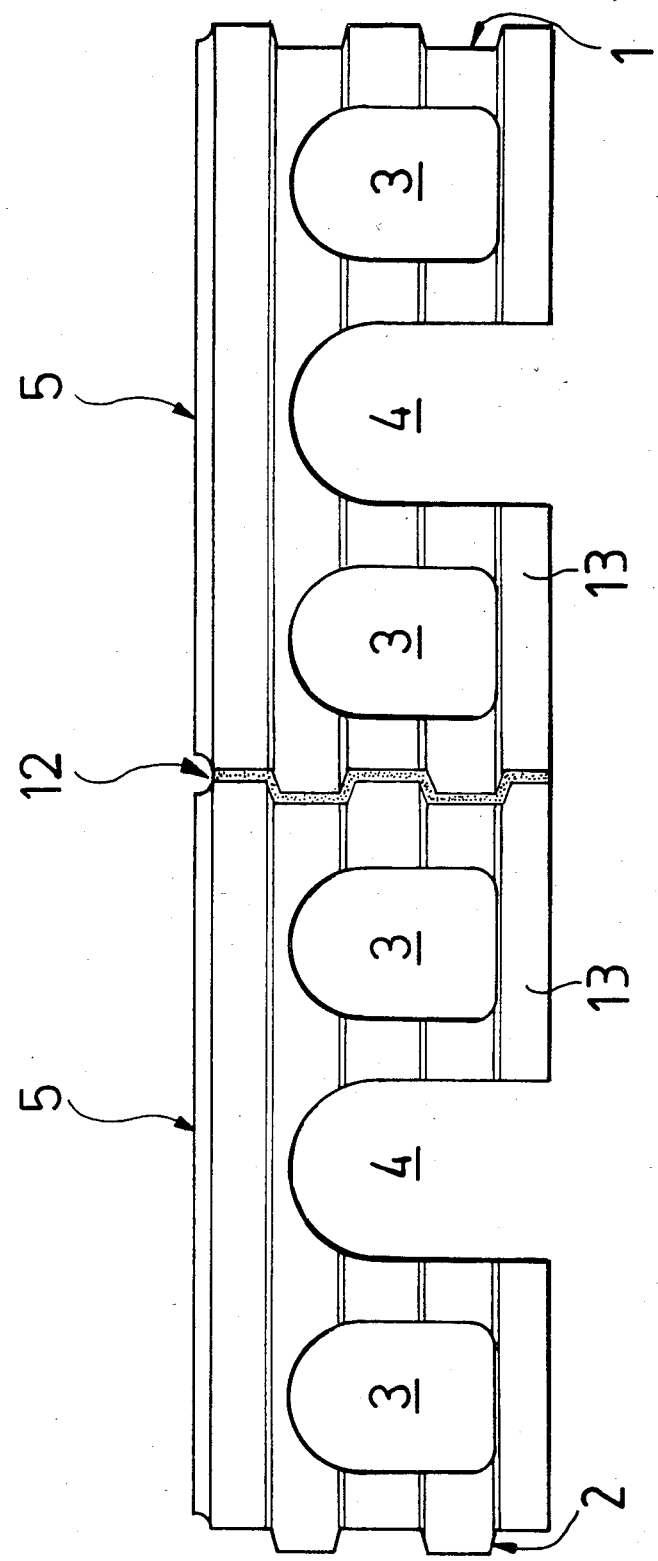
Figure 2:
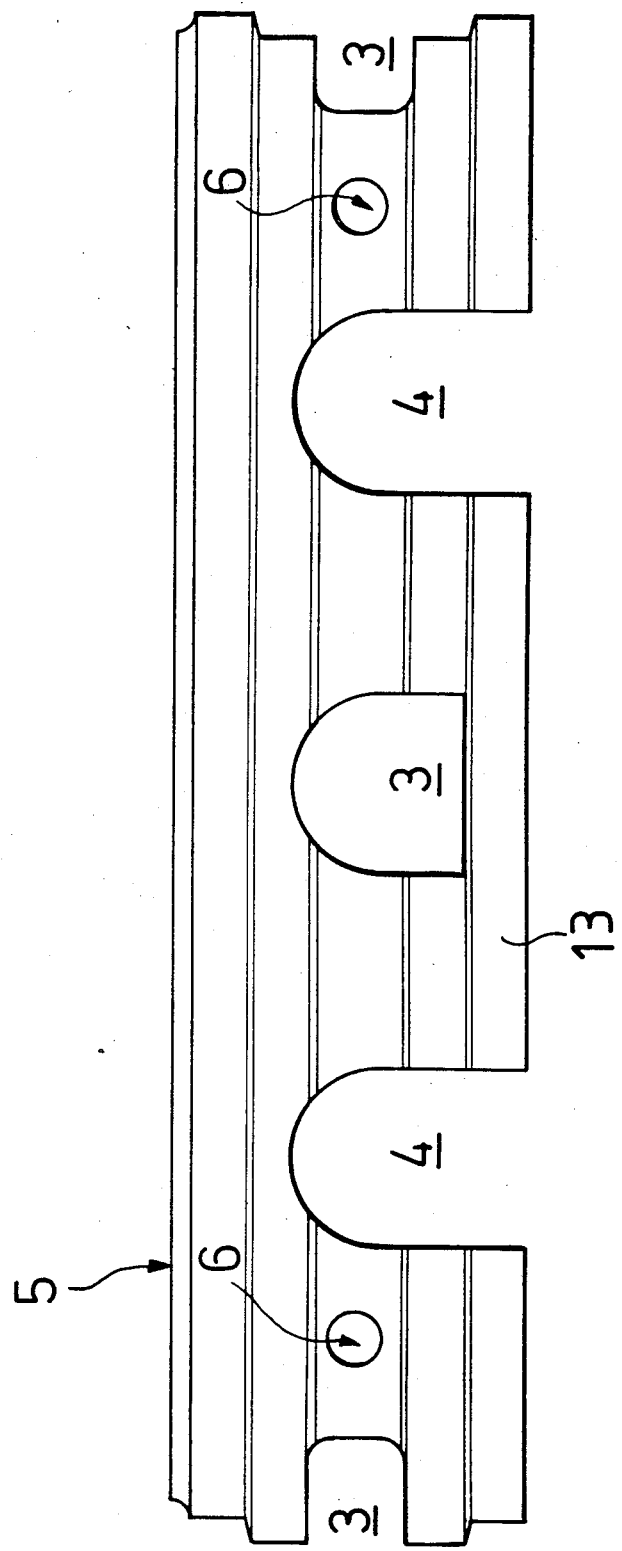

A tile block 13 as shown in FIGS. 1 and 2 is a block with the dimensions of 125×250×60 mm., for example. Of course, other dimensions may be utilized. The side walls of the tile block 13 are provided with grooves 1 and tongues 2 to provide for a tongue-and-groove interlock between adjacent tile blocks 13. The two tile blocks 13 according to FIG. 1 are cemented to one another by a cement layer 12 applied to their side surfaces. The upper end of the cement layer 12 is arranged in a recess for better appearance. The cement is preferably of the type which remains elastic in order to be able to adapt to movements of the subfloor without cracking or rupturing. This type of cement also facilitates the removal of some of the tile blocks and the remounting of new blocks if repairs should become necessary. The lower body portion of the tile block 13 includes channels 3, 4 which may be closed (3) or downwardly open (4). The open and closed channels intersect such that they are in communication with one another. The open channels 4 may be utilized to receive pipelines whereas the closed channels 3 are preferably utilized as air conducting or air supply channels.

FIG. 2 additionally shows mounting openings 6 adapted to receive bolts of an elastomeric material for the secure but resilient interconnection of two adjacent tile blocks. However, the openings 6 may alternatively be utilized as additional air passages.

Figure 3:
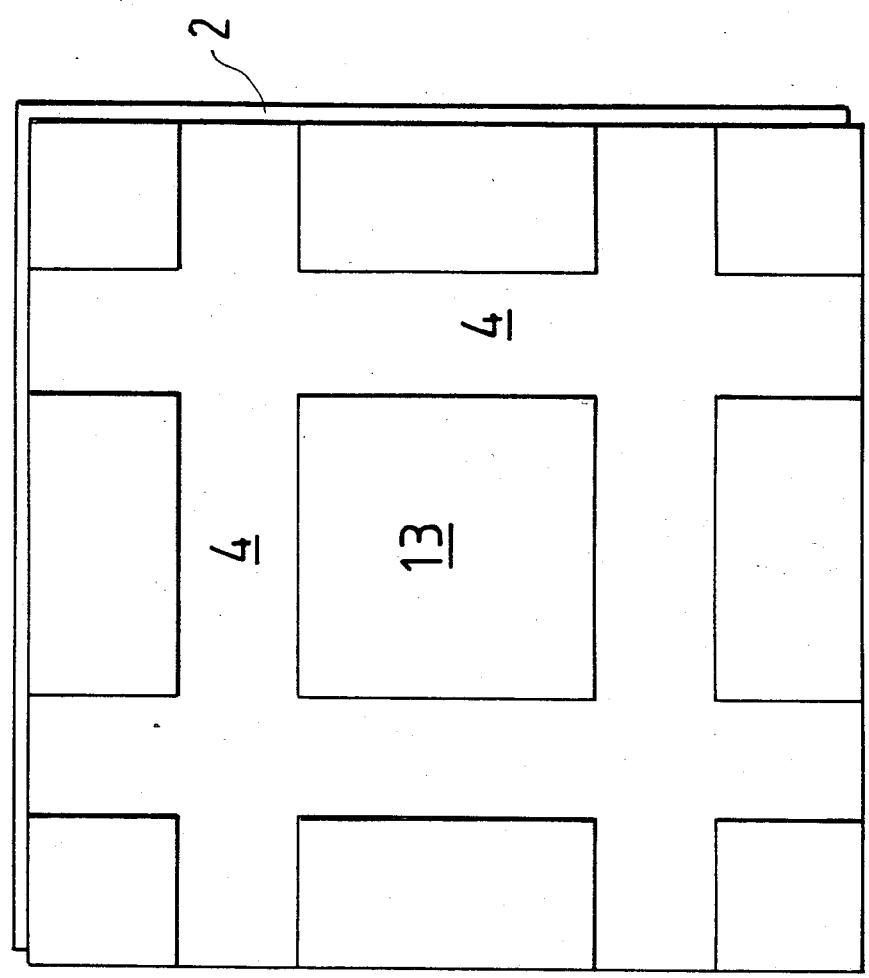

The surface 5 of the tile blocks may be smooth, profiled, flat or convex and it may or may not be glazed. FIG. 3 is a bottom view of a square tile block 13 according to the invention wherein the open channels 4 are clearly visible.

Figure 4:
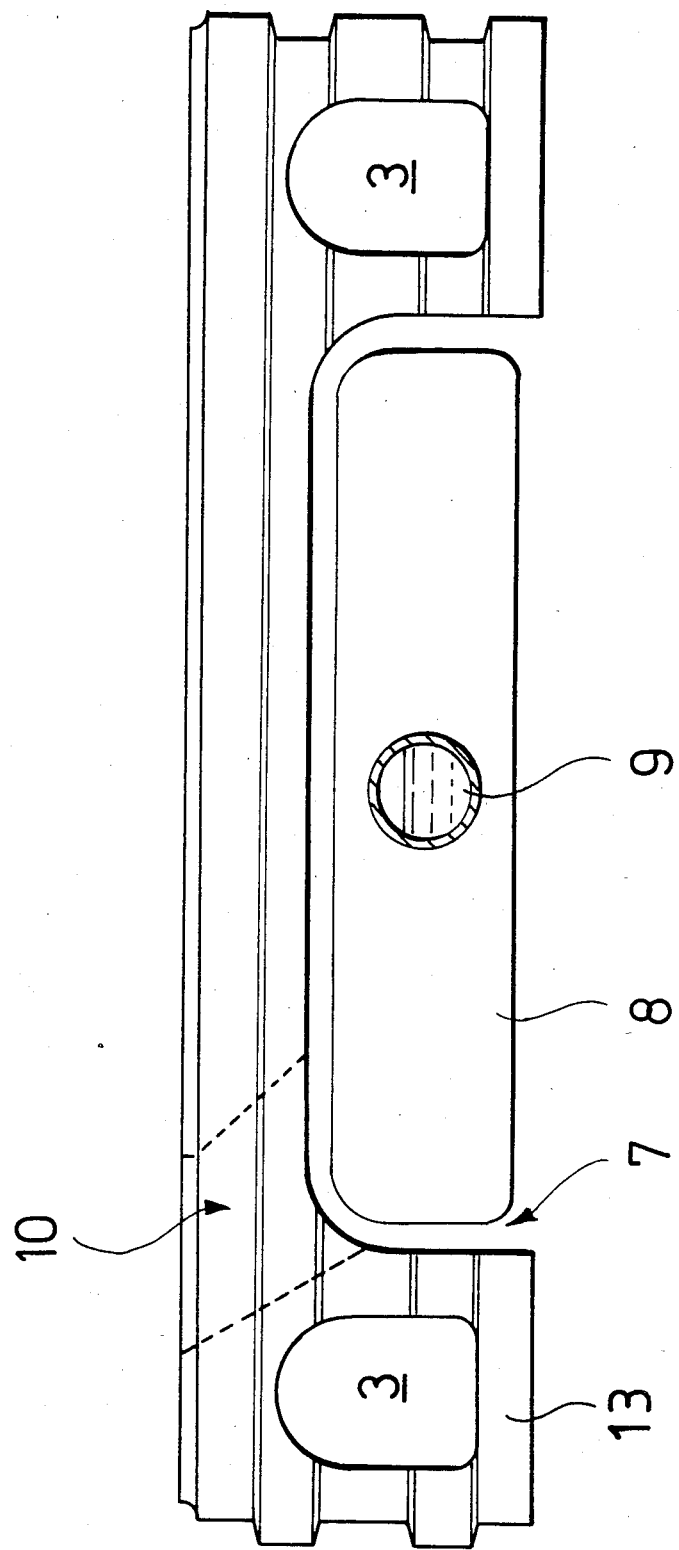
Figure 5:
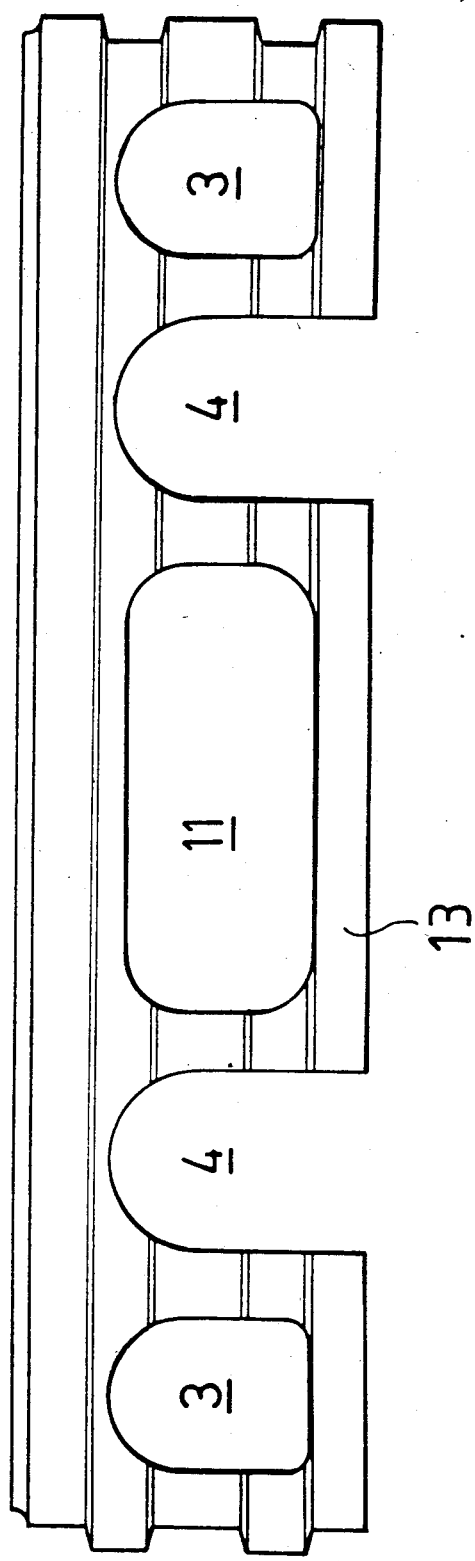

FIG. 4 shows a tile block 13 which is provided with a wide channel 7 extending in one direction and receiving, when mounted, a heating duct 9 around which is provided heat exchange structure 8. The heat exchange structure 8 may consist of heat exchange ribs or it may be layers of metallic fibers into which the heating duct 9 is embedded and which improve heat conduction from the heating duct 9 to the tiles. In this embodiment the heating duct 9 with the heat exchange structure may simply be laid out on the subfloor and the tile blocks are placed over the heating duct 9 and heat exchange structure 8 so that it is received in the channel 7, especially if the heat exchange structure consists of ribs. Slots 10 may extend from the channel 7 upwardly through the top wall of the tile block in order to permit air heated in the channel 7 to rise upwardly out of the tile block 13. The heating duct 9 in the channel 7 will, of course, also heat the tile block quite rapidly so that heat will be transmitted to a room also from the tile block. The heated air discharged from the slots 10 will cause new supply air to be drawn into the channel 7 from channels in adjacent stones which are in communication with one another through aligned passages in the side walls of adjacent tile blocks. The same is true for the arrangement of FIG. 5 wherein a central enclosed channel 11 and side channels 3 are provided and arranged to receive heated air which is conducted through the aligned channels 11, 3 of rows of tile blocks to rapidly heat the tile blocks. The heated air carried through the channels 11, 3 may finally be discharged into the room in which the tile blocks are mounted or the air may be simply conducted through the tiles to be utilized some other place or to be returned to an air heater.

Figure 6:
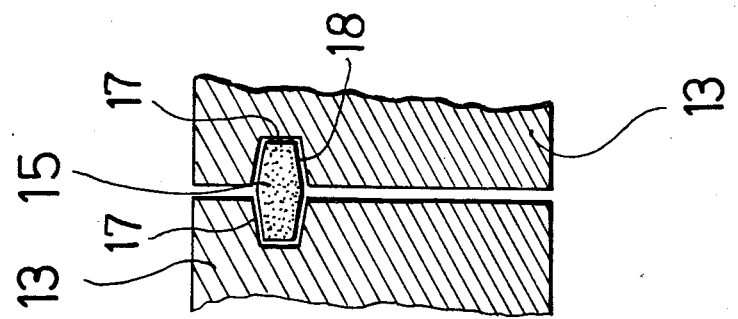

FIG. 6 shows in cross-section the areas of two adjacent tile blocks which are joined by means of an elastic strip 15. The elastic strip 15 may be so wide that a gap 16 remains between adjacent tile blocks, which gap 16 permits water to drain from the tile surface or which gap 16 may be utilized for permitting heated air to escape and rise from the tile blocks. If it is desired to mount the tile blocks directly adjacent one another without a gap therebetween, an elastic jointure strip 15 of corresponding smaller size may be utilized. The aligned grooves 17 in the side walls of adjacent tile blocks have preferably slightly tapered side walls and the strips 15 correspondingly tapered side walls 18 so as to automatically place adjacent tile blocks into proper positions relative to one another when they are forced toward each other during mounting.

Figure 7:
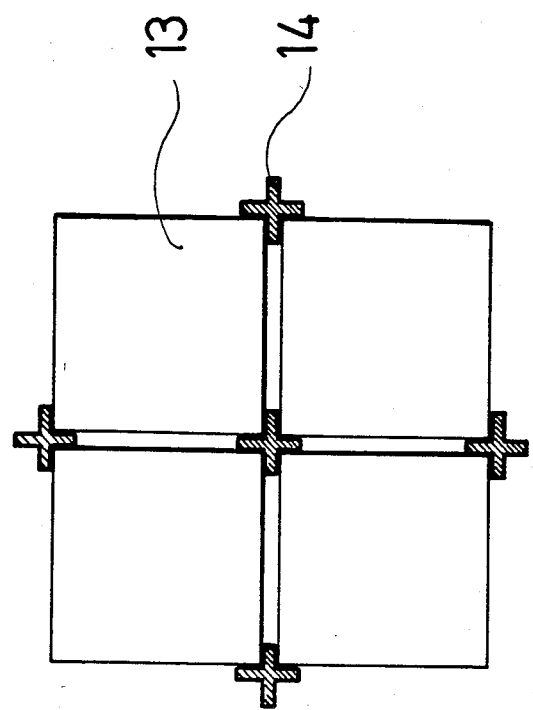

FIG. 7 shows another arrangement for joining adjacent tile blocks 13 wherein cross plate members 14 are disposed between the tile blocks at corner locations with the two normal cross plates of the members extending into the gaps between the tile blocks.

I claim:

1. A tile block for covering surface areas such as floors and walls, said tile block having a surface section and a lower body portion extending from the tile surface and having downwardly extending side walls so as to define said tile block, said body portion having a plurality of channels formed therein, of which channels some are closed at the tile bottom and some are open but all extend across said lower body portion and are so arranged as to be in alignment with corresponding channels of adjacent tiles when disposed on a support surface, at least two of said channels which are open at the tile bottom extending in a direction normal to one another so as to be capable of receiving pipes disposed on said supporting surface in either of the tiles major orientations to permit variations in the tiling pattern, said side walls being provided with accurately machined tongues and grooves for close interlocking engagement between adjacent tile blocks.

2. A tile block as claimed in claim 1, wherein said lower body portion consists of plastic.

3. A tile block as claimed in claim 1, wherein said lower body portion consists of stoneware.

4. A tile block as claimed in claim 1, wherein said lower body portion consists of a ceramic material.

5. A tile block as claimed in claim 1, wherein said lower body portion consists of a water-based setting material.

6. A tile block as claimed in claim 1, wherein said side walls are provided with a layer of permanently elastic cement.

7. A tile block as claimed in claim 1, wherein said tile blocks have a slightly arched (convex) top surface.

8. A tile block as claimed in claim 1, wherein the tile and the lower body portion are unitary.

9. A tile block as claimed in claim 8, wherein at least some of said open and closed channels are interconnected, that is, in communication with each other within a tile.

10. A tile block as claimed in claim 8, wherein passages are formed in said tile block so as to extend through said surface section at some of said channels to permit passage of fluid therethrough.

11. A tile block as claimed in claim 8, wherein said channels are of about the same height and arranged at the same distance from the tile surface.

12. A tile block as claimed in claim 8, wherein said side walls have openings extending normal to the tiles side walls and so arranged that they are aligned with corresponding openings of adjacent blocks when disposed adjacent one another on a support surface and that elastic connecting means are provided adapted to be received in said openings for mounting adjacent tile blocks to one another.

13. A tile block as claimed in claim 8, wherein resilient support members are provided, said support members extending across sections of adjacent tile blocks for engagingly supporting them and holding them in position relative to each other.

14. A tile block floor comprising a subfloor with tile blocks mounted thereon adjacent one another, said tile blocks having top surfaces and lower body portions with passages extending through the body portions such that the passages of adjacent tiles are in alignment for conducting a heating medium therethrough, at least two of said tile passages being open at the tile bottom and said two open passages extending normal to one another, with some of said tiles being disposed, with respect to a pattern on their surface in one orientation and the others in an orientation normal thereto, said tiles being closely interlocked with adjacent tiles by engagement of tongues and grooves accurately machined into their side walls so as to transmit support forces on one tile also to the adjacent tiles interlocked therewith.

15. A tile block floor as claimed in claim 14, wherein heating ducts are disposed on said subfloor so as to extend through said aligned open passages.

16. A tile block floor as claimed in claim 15, wherein said ducts are embedded in metallic fibers within said passages so as to provide for improved heat transfer from said ducts to said tiles.

* * * * *